United States Patent
Armat et al.

(12) 
(10) Patent No.: US 6,451,423 B1
(45) Date of Patent: Sep. 17, 2002

(54) CONTROLLED ATMOSPHERE PACKAGING

(75) Inventors: Rahim Armat, Mendenhall, PA (US); Prasad S. Potnis, Duluth, GA (US); Richard D. Pastor, Cincinnati, OH (US); Keith S. Shih, Loveland, OH (US); Leo Stoeberl, Greenwood Lake, NY (US); Victor P. Holbert, Loveland, OH (US)

(73) Assignee: International Paper Company, Tuxedo, NY (US)

( * ) Notice: Subject to any disclaimer, the term of this patent is extended or adjusted under 35 U.S.C. 154(b) by 27 days.

(21) Appl. No.: 09/652,025

(22) Filed: Aug. 31, 2000

(51) Int. Cl.$^7$ .............................. B32B 3/28; A21D 10/02; B65B 55/00
(52) U.S. Cl. ..................... 428/330; 428/167; 428/182; 428/331; 428/913; 426/118; 426/124; 426/395; 426/206; 426/204
(58) Field of Search ................................ 428/156, 167, 428/330, 331, 402, 182, 500, 913; 426/118, 124, 395, 418; 206/204

(56) References Cited

U.S. PATENT DOCUMENTS

| 4,366,179 A | 12/1982 | Nawata et al. |
| 4,528,228 A | 7/1985 | Clevenger |
| 4,552,767 A | 11/1985 | Saleeb et al. |
| 4,622,229 A | 11/1986 | Toshitsugu |
| 5,221,571 A | 6/1993 | Cammiss et al. |
| 5,286,407 A | * 2/1994 | Inoue et al. ................. 206/204 |
| 5,322,701 A | 6/1994 | Cullen et al. |
| 5,721,187 A | * 2/1998 | Ogawa et al. ........... 428/411.1 |

FOREIGN PATENT DOCUMENTS

WO    WO 98/31542    7/1998

* cited by examiner

*Primary Examiner*—Donald J. Loney
(74) *Attorney, Agent, or Firm*—Stewart L. Gitler; Michael J. Doyle

(57) ABSTRACT

The invention addresses the use of a composite carbon dioxide scavenging filler which has been dispersed uniformly into a polymeric matrix. The resultant layer can then be coated or laminated onto a paper, paperboard, foil, or other substrates. It can also be made into a cast or blown film. The carbon dioxide scavenging structure thus created desirably contains a polymeric matrix binder as the filler dispersion medium, one or more particular carbon dioxide scavenging fillers, one or more moisture producing/retaining agents or moisture retaining agents, and, optionally, one or more polymeric or surfactant dispersion/wetting agents aiding the wetting and the uniform dispersion of the fillers in the matrix. This allows products contained in a package, such as roasted coffee, or produce, to maintain freshness and counteract pressure buildup in a package which results in bulging, rupture, loss of freshness, poor shelf appearance, and increased anaerobic bacterial activity.

24 Claims, 1 Drawing Sheet

CONTROLLED ATMOSPHERE PACKAGING

BACKGROUND OF THE INVENTION

The invention is directed to a carbon dioxide gas scavenger-based material for use in packaging of coffee, fresh produce and the like. More particularly, there is disclosed a carbon dioxide scavenging layer for use as the interior layer of a package or container which includes at least one composite carbon dioxide absorbent or carbon dioxide scavenging filler material dispersed into a polymeric matrix.

Many food products such as roasted coffee, fresh produce, or the like, generate significant amounts of carbon dioxide after being packaged. This gas can lead to pressure buildups in the package resulting in: bulging; rupture; loss of freshness; poor shelf appearance; and increased anaerobic bacterial activity.

Traditionally, several approaches have been used to remove the carbon dioxide gas from the inside of a package. In one approach, as in the case of fresh produce, micro perforated films are used. These films allow the gaseous exchange of the carbon dioxide and the oxygen between the inside and the outside of the package thus allowing it to respire. These micro perforated films are expensive and cannot be used to package coffee which is sensitive to the effects of oxygen and moisture. Another type of approach has been used in the case of roasted coffee. A one way gas venting valve has been added to the package. These types of one way gas venting valves open when the carbon dioxide pressure inside the package exceeds the outside pressure and thereby vents out the excess carbon dioxide. These valves are relatively expensive, require separate expensive equipment to install, can slow production rates, and increase machine set up and down time. The valves also vent the aroma, which can affect the flavor and quality of the brewed coffee, along with the carbon dioxide to the atmosphere. Further, as the valve operates by the pressure difference between the inside and outside package, its performance can be affected by altitude.

In yet another approach, the carbon dioxide inside the package is reduced by sachets containing a scavenger material, such as an alkaline earth metallic oxide, or hydroxide that can selectively react with the carbon dioxide in the package. The sachets are relatively expensive, add an extra step to the filling process, and pose potential risks such as accidental grinding, rupture and ingestion.

U.S. Pat. No. 4,552,767, Saleeb et al, discloses a combination of calcium hydroxide and sodium or potassium hydroxide to be used as a carbon dioxide scavenger in coffee packaging. The patent relates to the use of an envelope or bag to contain the active ingredients (sachet). The preferred method attaches the sachet to the inside wall of the flexible package by heat sealing or gluing. The active components are not disposed in the polymer matrix and must be added as a separate step in the filling process.

International Application (WO 98/31542) discloses a packaging laminate with a $CO_2$ and $O_2$ scavenging core layer consisting of $Ca(OH)_2$ or CaO and low density polyethylene (LDPE). However, there is no mention of the scavenging rate or scavenging efficiency of the system. Normally the rate of $CO_2$ scavenging by $Ca(OH)_2$ or CaO or mixtures of both is very low under the dry environment. At a low relative humidity (RH) such as 25%, the reaction rate is very slow. In order to speed up the $CO_2$ scavenging rate, one has to maintain a high RH (for instance, 90%) in the packaging environments. In the case of storing dry food such as roasted coffee beans, the rate is too slow to effectively remove the $CO_2$ gas released from the roasted beans.

The present invention deals with an integrated $CO_2$ scavenging system, with an extremely fast rate of $CO_2$ reduction and a very high efficiency, by incorporating into a resin or resins using the usual compounding techniques: 1) $CO_2$ scavenging fillers such as alkaline earth metal hydroxides, alkaline earth metal oxides, alkali metal hydroxides, alkali metal oxides, or their mixtures, and 2) moisture producing/retaining agents or moisture retaining agents. The composite carbon dioxide scavenger filler is a combination of $CO_2$ scavenging filler and moisture producing/retaining agent or moisture retaining agent. The moisture producing/retaining agents include alkali metal hydroxides such as NaOH, KOH and alkali metal oxides such as $Na_2O$. The moisture retaining agents include, but are not limited to, hygroscopic desiccant materials such as silica gel, bentonite clay, NaCl, $CaCl_2$, attapulgite clay, magnesium sulfate, etc.

When the moisture retaining agents are incorporated into the resin along with the $CO_2$ scavenging fillers, one needs to condition the resin blends in high RH environments for a period of time so that the moisture retaining agents can absorb the moisture until they reach the point of saturation. Such an environment can be provided by steam treatment on line or off line and humidity chambers off line. The moisture kept within the moisture retaining agents can then speed up the $CO_2$ scavenging reaction.

When the moisture producing/retaining agent is used, water is generated by reaction with $CO_2$:

$$\text{alkali metal hydroxide} + CO_2 \rightarrow \text{alkali metal carbonate} + H_2O \quad (1)$$

Since the alkali metal hydroxides are also hygroscopic and deliquescent, the water produced by the above reaction is also retained in the system and thus speeds up the $CO_2$ scavenging rate. Another unique feature of these moisture producing/retaining agents is that they strongly absorb the moisture in the environments even at a very dry condition. For example, NaOH will keep absorbing the moisture from the environments until the relative humidity of the environments reach around 6% or below. Thus, no additional pre-conditioning is required when the moisture producing/retaining agent is used in the system. Similarly, alkali metal oxide, being hygroscopic and deliquescent, will absorb moisture and react to produce alkali metal hydroxide:

$$\text{alkali metal oxide} + H_2O \rightarrow \text{alkali metal hydroxide} \quad (2)$$

The alkali metal hydroxide will then react with $CO_2$ to produce water, as shown in Equation (1).

As far as the scavenging reaction of alkaline earth metal hydroxide and alkaline earth metal oxide, the following reactions, for example, can take place:

$$Mg(OH)_2 + CO_2 \rightarrow MgCO_3 + H_2O \quad (3)$$

and $$CaO + H_2O \rightarrow Ca(OH)_2 \quad (4)$$

$$Ca(OH)_2 + CO_2 \rightarrow CaCO_3 + H_2O \quad (5)$$

The $CO_2$ scavenging reactions by alkaline earth metal hydroxide or alkaline earth metal oxide, as shown in Equation 3 through 5, require a humid environment in order to achieve a reasonable reaction rate. The addition of moisture producing/retaining agents or moisture retaining agents into these alkaline earth metal hydroxide or oxide will dramatically increase the scavenging rates.

It is an objective of the present invention to provide a cost effective, safe, and unique way to remove the carbon dioxide from the inside of a coffee package, or container.

It is a further objective of the invention to integrate the composite carbon dioxide absorbent scavenger material into the interior wall of a package or container itself.

It is a further objective of the invention to incorporate the composite carbon dioxide absorbent scavenger material into the wall of a package, as part of a blend, in the layer in direct contact with the carbon dioxide from the coffee or adjacent to a functional heat seal layer with the desired diffusion properties.

It is an objective of the invention to make the composite carbon dioxide scavenger material integral with the package without the need for installation and/or insertion operations, as used in the case of degassing valves, or sachets.

It is a further objective of the invention to utilize a metal hydroxide, or oxide, or mixtures thereof, in combination with a moisture producing/retaining agent or moisture retaining agent, as a composite scavenger that can absorb and/or react with high levels of carbon dioxide rapidly and efficiently.

It is a further objective of the invention to increase the surface area of the product contact scavenging layer and therefore the efficiency of the scavenger material by modifying a package, such as by using a corrugated coated film or corrugating the whole multilayer coated package structure, or by designing ribs or gussets in the package.

SUMMARY OF THE INVENTION

A cost effective, safe and unique way to remove carbon dioxide from the inside of a coffee package is to integrate a composite carbon dioxide absorbent scavenger material into the walls or directly into a layer of the package itself. This can be done by coating the layer as a blend, as the layer in contact with the carbon dioxide from the coffee. The scavenger layer becomes part of a multilayer structure, which also includes if desired, moisture and oxygen barrier materials. The absorbent scavenger material, which is blended into a polymeric matrix, can also be coated onto the inner side of a substrate. The scavenger compound can also be made directly into a blown or cast film, either as an individual layer of a multilayer coated extruded film or as a monolayer film on its own. A high level of carbon dioxide absorption requires a high percentage of the scavenger absorbent filler in the coated blend. This can be achieved by compounding various percentages of an absorbent such as calcium hydroxide, or calcium oxide, or other metal hydroxides, or oxides, in a polymeric matrix resin such as a low density polyethylene, or the like. A moisture producing/retaining or moisture retaining agent is also added into the scavenger filler (forming the composite $CO_2$ scavenging filler) to ensure a fast and complete reaction with $CO_2$. The scavenging blend can be produced using a twin-screw extruder, or a single screw extruder equipped with the mixing elements, or a single screw kneader, or an internal mixer such as a Banbury mixer. Along with the composite filler and polymer matrix, a preferred compatabilizer is added to enable one to achieve good dispersion and mixing at high levels of the filler. Due to the basic nature of the carbon dioxide scavenging fillers, care is taken not to use very strong mixing elements in the screws to protect the polymer elements. If desired, antioxidants can be added into blends to reduce the extent of degradation to the resins. The particle size of the filler also can affect the compounding and the absorption. Agglomeration of particles can reduce efficiency of the scavenger performance. The moisture content of the composite scavenger filler as well as the polymer can have an effect on the dispersion of the filler particles. Drying of the composite scavenger fillers or polymers may be necessary in some cases to reduce the moisture contents in order to obtain a homogeneous mixture of the blends. The carbon dioxide scavenging is a surface effect, and hence the larger the area of the coated surface, the greater the amount of the carbon dioxide absorbed by, and/or reacted with the scavenger.

DETAILED DESCRIPTION OF THE INVENTION

Figure 1:
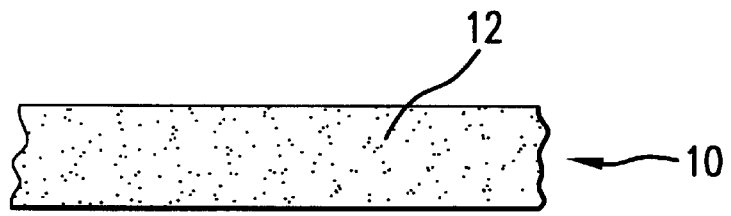
FIG. 1 is a cross-sectional view of a layer embodying the present invention.
Figure 2:
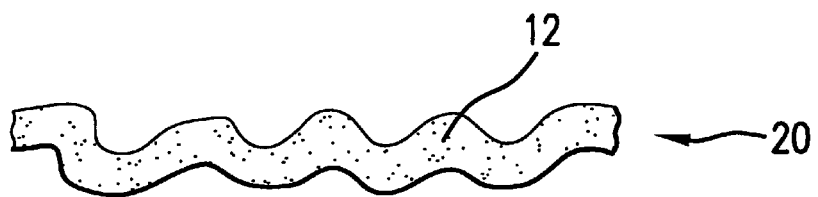
FIG. 2 is a cross-sectional view of a layer embodying the present invention which has been corrugated.

The invention focuses on the use of a carbon dioxide scavenging filler material in combination with a moisture producing/retaining agent or a moisture retaining agent (forming the composite $CO_2$ scavenger filler) which has been incorporated or dispersed into a polymeric matrix. The carbon dioxide scavenging filler material 12 in combination with a moisture producing/retaining agent or a moisture retaining agent (forming the composite $CO_2$ scavenger filler), as depicted in the three figures, is incorporated into a polymeric matrix 10 or 20, as depicted in FIGS. 1 and 2.

Figure 3:
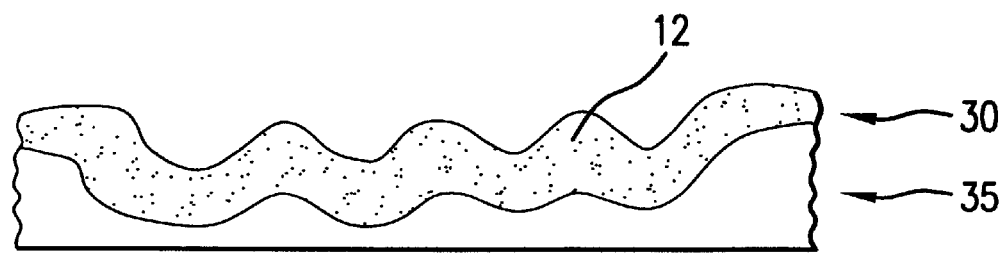
FIG. 3 is an alternate embodiment of the invention depicting a multilayer laminate package having a product contact layer of the carbon dioxide scavenging material.

FIG. 3 depicts a carbon dioxide scavenging layer 30 having a carbon dioxide scavenging filler in combination with a moisture producing/retaining agent or a moisture retaining agent (forming the composite $CO_2$ scavenger filler) dispersed therein, in a multilayer structure. This particular embodiment depicts the product contact layer 30 being adhered to a substrate 35. The substrate can be any common packaging material such as single or multilayer polymeric films, coated or deposited films (polyvinylidene chloride coating, deposited aluminum oxide layer, deposited metal layer, and the like), foils, papers, paperboards or combinations thereof. The carbon dioxide absorbent filler in combination with a moisture producing/retaining agent or a moisture retaining agent (forming the composite $CO_2$ scavenger filler) dispersed into a polymeric matrix can also be made into a cast or blown film.

The carbon dioxide absorbent structure created and embodying the present invention contains at least three, and desirably up to four components, namely: one or more matrix polymers as the filler dispersion medium; one or more particulate carbon dioxide scavenging filler materials; one or more moisture producing/retaining or moisture retaining agents to ensure a fast reaction rate; and, optionally, one or more polymeric or surfactant dispersion/ wetting agents, aiding the wetting and uniform dispersion of the fillers in any medium.

The dispersion medium used in the structure is a thermoplastic polymer with high permeability to carbon dioxide, and preferably, to moisture vapor. It is preferable that the matrix polymer does not contain a large amount of acid functionality to avoid reaction with the absorbent filler. Also, for melt processing applications, it is preferable that the polymer is stable at the processing temperatures for extrusion coating, extrusion compounding, film casting, or blown film applications. The typical temperature range is from 180° C. to 310° C. Examples of suitable matrix polymers are: polyolefins, polyolefin copolymers, acrylic polymers, vinyl polymers, and the like. Any suitable thermoplastic material meeting these criteria could be used as the polymeric matrix material.

The carbon dioxide scavenging filler can be oxides, or hydroxides, of calcium, magnesium, sodium, or the like. The particulate size of the scavenger should be less than 0.1 mm, but larger than 0.0005 mm. A final concentration of the absorbent filler or fillers in combination with a moisture producing/retaining agent or a moisture retaining agent (forming the composite $CO_2$ scavenger filler) in the carbon dioxide scavenging layer should be in the range of 10% to 90% of the total compound weight. It is preferred, that the concentration of the absorbent fillers in combination with a moisture producing/retaining agent or a moisture retaining agent (forming the composite $CO_2$ scavenger filler) be in the range of 30% to 70% with the exact concentration depending on the desired scavenging rate and capacity.

The moisture producing/retaining agents can be alkali metal hydroxides or alkali metal oxides. Since alkali metal hydroxides, such as NaOH and KOH, can also react directly with $CO_2$, they can be considered as dual functional fillers (both as a $CO_2$ scavenging filler and a moisture producing/retaining agent). Alkali metal oxide such as $Na_2O$, on the other hand, can also scavenge $CO_2$ via a two step process. It will first react with the absorbed moisture, according to Equation (2), to produce sodium hydroxide. Then the $CO_2$ scavenging reaction takes place followed by the reaction according to Equation (1). Therefore, alkali metal oxides can also be considered as dual functional fillers. In other words, the system may only contain one alkali metal oxide, or one alkali metal hydroxide, incorporated into a polymer matrix such as low density polyethylene, other polymers, or polymer blends without any additional moisture retaining agent. The moisture retaining agents can be hygroscopic desiccant fillers. They include, but are not limited to, silica gel, bentonite clay, attapulgite clay, calcium chloride, sodium chloride, potassium chloride, lithium chloride, magnesium chloride, and magnesium sulfate. Alternatively, hygroscopic polymers or water soluble polymers can be blended with the matrix polymer to retain the moisture in the layer and speed up the scavenging rates. They include polyamide, ethylene vinyl alcohol copolymers, polyethylene oxide, polyethylene imine, and polyacrylic acid. The amount of moisture producing/retaining agent or moisture retaining agent needed in the blends may range from a ratio of 99:1 (total weight of the $CO_2$ scavenger absorbent fillers:total weight of the moisture producing/retaining agents or moisture retaining agents) to a ratio of 1:99 (total weight of the $CO_2$ scavenger absorbent fillers:total weight of the moisture producing/retaining agents or moisture retaining agents). It is preferred that the ratio of the total amount of absorbent fillers to the total amount of moisture producing/retaining agents or moisture retaining agents be in the range from 95:5 to 25:75.

The dispersion agent used in the absorbed structure, if desired, is a low to medium molecular weight polymer or surfactant with a compatabilizing functionality such as an acid, acid salt, anhydride, ester, or the like. The concentration of the dispersion agent is in the 0.5 to 20% range, preferably in the 1% to 10% range, based on the total compound weight.

Compatibilizers or dispersion agents include, but are not restricted to, the following list:

1. Carboxylic acids and their derivatives, like metal acid salts, acid anhydrides, acid chlorides, etc. Examples include stearic acid, calcium stearate, succinic acid, maleic anhydride, etc.

2. Copolymers of ethylene with vinyl, acrylic or other aliphatic, aromatic and aliphatic organic esters. Examples include ethylene-acrylic acid copolymers, ethylene vinylacetate copolymers, or ethylene-maleic anhydride copolymers. Commercial grades include AlliedSignal's Aclyn 295, AC-400, Dow Chemical's Primacor 5980 or DuPont's Nucrel 499 and others.

3. Various polyolefins (examples include polyethylenes or polypropylenes) grafted with acid or anhydride or other acid derivative functional groups. Examples include Actone 2573 and ACX 575 from AlliedSignal, Polybond 1009 and Polybond 3009 from Uniroyal Chemicals, Eastman Chemicals' Epolene C-18P, etc.

Antioxidants or thermal stabilizers are added to the compounds to minimize the amount of degradation to the polymer resins. Typical antioxidants or thermal stabilizers include but are not limited to the following list:

1. Hindered phenols type of antioxidants such as Irganox 1010 or Irganox 1076 from Ciba Specialty Chemicals.

2. Hindered amines type of stabilizers such as Tinuvinn 622 or Tinuvin 783 from Ciba Specialty Chemicals.

3. Phosphites stabilizers such as Irgafos 168 or Irgafos 12 from Ciba Specialty Chemicals. These phosphites stabilizers are typically blended with hindered phenols type of antioxidants to achieve the synergistic effects.

4. Lactone type of antioxidants such as HP-136 from Ciba specialty Chemicals.

5. Vitamin E antioxidants such as Irganox E201 from Ciba Specialty Chemicals.

6. Amine antioxidants such as Naugard 445 from Uniroyal Chemical Company, Inc.

7. Metal deactivators such as Irganox MD-1024 from Ciba Specialty Chemicals or Naugard XL-1 from Uniroyal Chemical Company, Inc.

These can be added individually or in combination with other types of stabilizers to achieve the best results. The concentration of the total antioxidants or thermal stabilizers in the blends is in the 0.01% to 4% range, preferably in the 0.02% to 1% range, based on the total compound weight.

The scavenging filler along with the moisture producing/retaining agent or moisture retaining agent can be incorporated into the polymer matrix using a melt process by compounding the particular filler mixtures into the matrix using a twin-screw extruder or single screw kneader. Other types of compounding equipment, such as a single screw extruder with mixing elements or a Banbury mixer can also be used. The processing conditions, such as the screw rpm and zone temperatures, the formulation such as the type and concentration of the dispersion agent or the type and concentration of the thermal stabilizer or antioxidants, can be optimized to obtain best dispersion and carbon dioxide scavenging rates.

The scavenger-based blend can then be mono or coextrusion coated as a layer, or layers, onto the product contact side of other single or composite layer materials such as films, foils, or papers. The blend can also be used to produce a cast or blown film which can then be laminated, in any manner, to a single or composite layer material.

In addition, mixtures of scavenger fillers such as mixtures of magnesium and sodium hydroxides, and/or oxides, or their mixture with calcium compounds can be used to improve carbon dioxide scavenging performance.

Further, an increase in the coated surface area of the product contact layer can be achieved by modifying the package design by corrugating the whole multilayer package material or by laminating a corrugated scavenger coated film to the regular multilayer packaging material (see FIGS. 2 and 3). The addition of ribs or gussets to the interior of a package will also increase surface area. The percentage of the scavenger in the blend and the coat weight of the extruded blend also affects the level of carbon dioxide scavenged. Higher loadings at higher coat weights react with more carbon dioxide. This can be adjusted based on the surface area and individual product requirements. The scavenger blend can be extrusion coated along with a tie layer, such as ethylene acrylic acid copolymer, ethylene methacrylic acid copolymer, a zinc or sodium ionomer, ethylene maleic anhydride graft copolymer, low density polyethylene, linear low density polyethylene, or other suitable tie materials, that bond it to the main laminate structure or the substrate. Another tie layer, of similar polymers, can be extrusion coated or laminated on top of the scavenger layer as the product contact layer or sealing layer to enable the package to be heat sealed, if desired. This process can be done using multilayer coextrusion as well. The type and coat weight of the polymer that forms the product contact or sealing layer can also affect the diffusion of carbon dioxide into the scavenger layer, and hence control the efficiency of the scavenger.

A particularly cost effective, safe and unique way to remove carbon dioxide from inside the package is to integrate the carbon dioxide scavenger into the walls of the package itself. This can be achieved by compounding 45 to 55 wt % (based on the total compound weight) of a calcium hydroxide, or a calcium oxide, or mixtures thereof and 5 to 10 wt % (based on the total compound weight) of NaOH or KOH, into a polymeric matrix resin, such as a low density polyethylene. A twin-screw extruder with the adequate mixing elements can enable one to achieve good dispersion in mixing at the high levels of the above fillers. An optional dispersion agent can be added to help disperse the fillers into the polymer matrix. The preferred dispersion agents include Aclyn 295 or AC-400 from AlliedSignal. Agglomeration of the particles can reduce efficiency of the scavenger performance. The moisture content of the carbon dioxide scavenging fillers and the polymer resins should be kept at a low level to ensure even distribution of the filler particles without any agglomeration.

The carbon dioxide scavenger material interacts with the carbon dioxide from the roasted packed coffee after the moisture from the moisture producing/retaining agent or moisture retaining agent activates the reaction of the carbon dioxide with the calcium hydroxide or oxide. This is an effective mechanism to scavenge the carbon dioxide and is less expensive and easier to use than venting valves and absorbent sachets.

Following are examples of the scavenging fillers in the powder form (not been incorporated into the resin) and the polymeric matrix containing the scavenging filler with or without the moisture producing/retaining agent or moisture retaining agent dispersed therein:

EXAMPLE 1

Mason jars having a headspace of around 950 ml were used for the tests. Each jar contained 2.5 g of powder sample. The calcium hydroxide used was CODEX MV-325 from Mississippi Lime Company. The sodium hydroxide used was obtained from NAKOH Chemical Company, Inc. In order to maintain the relative humidity inside the jars at 25%, approximately 5 ml of a 13.41 molal LiCl solution (from High-Purity Standards, Lot #933422) was used. Likewise, for the 90% RH samples, a 0.5 molal KCl solution (from High-Purity Standards, Lot #919304) was used. The solution was placed in an open glass vessel which was in turn placed inside the Mason jar with the powder sample in such a way that the powder was not in direct contact with the liquid. The dry mixture samples contained 90 wt % $Ca(OH)_2$ and 10 wt % NaOH. The mixtures were simply prepared by hand mixing. The jars were purged with $CO_2$ for 90 seconds and then capped for the test. Three jars of each variable were made and tested. The data below represents an average of the three jars. Control jars were $CO_2$ flushed and capped. No humidity control was added to the control jars as well as one of the powder mixtures containing 10 wt % NaOH as the moisture producing/retaining agent. The headspace $CO_2$ content was then analyzed with a Hewlett Packard 5890 Series II gas chromatography instrument. The data reported here are the $CO_2$ headspace content inside the jars in terms of volume%.

TABLE 1

$CO_2$ content (vol %) in the headspace as a function of storage time

| Powder Sample | % RH | 0 hr. | 24 hrs. | 48 hrs. | 72 hrs. | 144 hrs. | 196 hrs. |
|---|---|---|---|---|---|---|---|
| $Ca(OH)_2$ | 25 | 100 | 98.23 | 97.46 | 96.51 | 92.17 | 90.86 |
| $Ca(OH)_2$ | 90 | 100 | 58.21 | 46.76 | 38.42 | 23.89 | 21.94 |
| $Ca(OH)_2$/NaOH | 25 | 100 | 51.79 | 31.15 | N/A | 13.15 | N/A |
| $Ca(OH)_2$/NaOH | 90 | 100 | 33.45 | 21.59 | 16.54 | 12.58 | 12 |
| $Ca(OH)_2$/NaOH | N/A | 100 | 39 | 29.13 | N/A | 24.58 | N/A |
| Control | N/A | 100 | 99.25 | 97.48 | 97.74 | 94.63 | 93.63 |

It is quite obvious that $Ca(OH)_2$ by itself and at a relative humidity of 25% did not scavenge much $CO_2$ in the headspace. When the RH of the test jars was maintained at 90%, the scavenging rate became faster. When the dry mixture contained 10 wt % NaOH as the moisture producing/retaining agent, the $CO_2$ scavenging rates were very fast regardless of whether the jars were maintained at 25% RH, 90% RH, or without any humidity control.

EXAMPLE 2

Calcium hydroxide filled low density polyethylene (LDPE) compound was made using a 27 mm Leistritz twin screw extruder in the laboratory. A pair of co-rotating fully intermeshing screws with various segments of mixing elements (kneading blocks) was used in this experiment. A 6 inch flex lip film die was attached directly to the discharge end of the twin screw extruder. A C.W. Brabender UNIVEX film take-off device was used to collect the film. The temperature profile of the extruder was: zone 1 through zone 7 at 165° C. and zone 8 through zone 10 at 185° C.

The LDPE used was PE 1017 from Chevron Chemical Company. The calcium hydroxide used was CODEX MV-325 from Mississippi Lime Company. A dispersion agent, Aclyn 295A from AlliedSignal, was used in the formulations. A stabilizer concentrate containing 1 wt % of vitamin E antioxidant (designated as antioxidant VE) was obtained from Ampacet Corporation (Ampacet product code—100363). Another antioxidant concentrate in LDPE was evaluated. This antioxidant concentrate contained 2 wt % of HP-2225, a lactone based antioxidant package obtained from Ciba Specialty Chemicals Corporation. It was designated as antioxidant HP. The LDPE resin and antioxidant concentrates were dried at about 70° C. for at least 10 hours before. The as received calcium hydroxide had a moisture content of around 0.5% and no additional drying was performed.

In this laboratory trial, the LDPE resin was fed from the main in-feed whereas the filler was fed into the extruder via a side stuffer located down stream. This effectively reduced the residence time of the LDPE/Ca(OH)$_2$ mixture inside the extruder. Since the filler was fed down stream, it by-passed a section of the screw which consists of a number of kneading blocks. This could further minimize the extent of LDPE degradation in the extruder.

The LDPE resin and the antioxidant concentrate were dry blended in the appropriate proportions first and then placed into the hopper of a K-Tron volumetric feeder. The calcium hydroxide and dispersion aid were also dry mixed first and then placed in another volumetric feeder which fed the side stuffer. The feed rates were graphically determined from the calibration curves obtained by using the LDPE resin and the Ca(OH)$_2$ particles, respectively. Table 1 lists all the formulations and experimental conditions used in the trial. The feed rate listed was the total feed rate from the main feed and the side stuffer. The feed rates from both feeders were the same, e.g., 8 lbs/hour for each feeder.

TABLE 2

The formulations and experimental conditions used in the trial

| Run # | LDPE Content wt % | Ca(OH)$_2$ Content wt % | Dispersion Aid Content wt % | Antioxidant Concentrate Content wt % | Feed Rate lb/hr | Screw Speed rpm | Melt Temp. °C. |
|---|---|---|---|---|---|---|---|
| 1 | 50 | 49 | 1 | 0 | 16 | 90 | 199 |
| 2 | 50 | 49 | 1 | 0 | 16 | 250 | 203 |
| 3 | 50 | 49 | 1 | 0 | 16 | 500 | 208 |
| 4 | 47.5 | 49 | 1 | 2.5(VE) | 16 | 90 | 202 |
| 5 | 47.5 | 49 | 1 | 2.5(VE) | 16 | 250 | 203 |
| 6 | 47.5 | 49 | 1 | 2.5(VE) | 16 | 500 | 202 |
| 7 | 47.5 | 49 | 1 | 2.5(HP) | 16 | 90 | 200 |
| 8 | 47.5 | 49 | 1 | 2.5(HP) | 16 | 250 | 203 |
| 9 | 47.5 | 49 | 1 | 2.5(HP) | 16 | 500 | 206 |

The film quality from this trial was very good. The dispersion of the filler was excellent for all the cases. The screw speed did not seem to affect the dispersion of the film. However, there was a somewhat observable difference in the melt strength of the compound between the various samples. This was evidenced from the drawing of the film on the film take-off device. The first formula (run #1 to run #3) exhibited a poorer melt strength because film breakage was more frequent as we attempted to draw thinner films using higher take up speeds. As the antioxidant was added into the formula as in run #4 through #6 (vitamin E based antioxidant) or in run #7 through #9 (lactone based antioxidant), the melt strength appeared to improve as the drawing was smoother with less frequent breakage. There was no 10 observable difference in melt strength between the formula containing vitamin E antioxidant and the formula containing lactone antioxidant.

EXAMPLE 3

Compounded film samples were prepared using the typical extrusion conditions as described in Example 2, except that two gravimetric feeders were used. The feed rate was 10 lbs/hour for both feeders. All the raw materials used to prepare these film samples were the same as the ones listed in the previous examples. The sample designations and their compositions are:

CL-138: 50% Ca(OH)$_2$/45% LDPE/5% VE concentrate

CL-171: 1% NaOH/49% Ca(OH)$_2$/45% LDPE/5% VE concentrate

CL-172: 2.5% NaOH/47.5% Ca(OH)$_2$/45% LDPE/5% VE concentrate

CL-173: 5% NaOH/45% Ca(OH)$_2$/5% LDPE/5% VE concentrate

These film samples were stored in sealed polyethylene bags before use. Different type jars were used for these tests. The jars were 500 ml bottles fitted with rubber septa and aluminum seal that can be crimped to seal the bottles. For each test, approximately 5 g of compounded film was used. The samples were not conditioned prior to the test. The jars were purged with $CO_2$ for 90 seconds and then sealed with a crimper for the test. Three jars were made for each variable and the reported results are an average of the three jars. Control jars (without any film samples) were also $CO_2$ flushed and sealed. The relative humidity of the jars was not controlled.

TABLE 3

$CO_2$ content (vol %) in the headspace as a function of storage time

| Sample | 0 hr. | 24 hrs. | 48 hrs. | 72 hrs. | 96 hrs. | 168 hrs. | 192 hrs. |
|---|---|---|---|---|---|---|---|
| CL-138 | 92.36 | 86.56 | 88.07 | 87.43 | N/A | N/A | N/A |
| CL-171 | 96.01 | 94.47 | 93.19 | 93.01 | 92.08 | 90.11 | 89.71 |
| CL-172 | 96.72 | 85.63 | 82.81 | 81.6 | 79.29 | 0 | 0 |
| CL-173 | 96.51 | 26 | 0 | 0 | 0 | 0 | 0 |
| Control | 96.07 | 96.5 | 96.42 | 96.57 | 96.34 | 96.4 | 96.46 |

The film sample CL-138, having no NaOH addition, did not scavenge much $CO_2$ in the headspace. The film sample CL-173, having a Ca(OH)$_2$/NaOH weight ratio of 45:5, exhibited a very fast scavenging rate. The film sample CL-172, having a Ca(OH)$_2$/NaOH weight ratio of 47.5:2.5, showed a moderate rate in the first 4 days but eventually completely scavenged the $CO_2$ in the headspace. The sample CL-171, having a Ca(OH)$_2$/NaOH weight ratio of 49:1, did not scavenge much $CO_2$ in the headspace even after 8 days.

EXAMPLE 4

Another compounded film sample was prepared using the typical extrusion conditions listed in Example 2, except that two gravimetric feeders were used. The feed rate was 8 lbs/hour for the feeder which held the $Ca(OH)_2$/NaOH dry blends and 12 lbs/hour for the feeder which held the resin and stabilizer concentrate dry blends. The sample designation and composition is:

CL-142:36% $Ca(OH)_2$/4% NaOH/54% LDPE/6% VE concentrate

The film sample was stored in a polyethylene bag before use. Again, approximately 5 g of film was placed in each jar (500 ml with rubber septa/aluminum seal). The conditioned jars were prepared by placing the jars, with film sample inside and uncapped, in a controlled environmental chamber operating at 55° C. and 88% RH. The samples were conditioned for 6 hours. Then the jars (both the conditioned and the non-conditioned) were purged with $CO_2$ for 90 seconds and then sealed with a crimper for the test. Data is an average of three jars. Control jars (without any film samples) were also $CO_2$ flushed and sealed. Data was only collected for the first 24 hour period.

TABLE 4

$CO_2$ content (vol %) in the headspace as a function of storage time

| Sample | Initial (~4 hrs.) | 24 hrs. |
| --- | --- | --- |
| CL-142 (conditioned) | 48.51 | 9.22 |
| CL-142 (non-conditioned) | 54.04 | 15.37 |
| Control | 96.64 | 96.72 |

It can be seen that the initial values for all of the samples were quite low because a significant amount of scavenging had already occurred in the approximately 4 hours span between the time that the jars were flushed and capped and when the initial readings were taken. The scavenging rates in both the conditioned and non-conditioned jars were very fast.

EXAMPLE 5

Another film sample was prepared using the typical extrusion conditions listed in Example 2, except that two gravimetric feeders were used. The feed rate was 10 lbs/hour for both feeders. In this sample, bentonite clay was used as the moisture retaining agent. The bentonite clay used was obtained from Whittaker, Clark & Daniels, Inc. The product code is 670SC. The bentonite clay was dried in an oven at about 70° C. for at least 10 hours before use. The clay was dry blended with $Ca(OH)_2$ first and then put in the gravimetric feeder that fed the side stuffer. The sample designation and composition is:

CL-145:45% $Ca(OH)_2$/5% bentonite clay/55% LDPE/5% VE concentrate

The film sample was stored in a sealed polyethylene bag before use. Again, approximately 5 g of film was placed in each jar (500 ml with rubber septa/aluminum seal). The conditioned jars were prepared by placing the jars, with film sample inside and uncapped, in a controlled environmental chamber operating at 55° C. and 88% RH. The samples were conditioned for 6 hours. Then the jars (both the conditioned and the non-conditioned) were purged with $CO_2$ for 90 seconds and then sealed with a crimper for the test. Data is an average of three jars. Control jars (without any film samples) were also $CO_2$ flushed and sealed. Data was only collected for the first 24 hour period.

TABLE 5

$CO_2$ content (vol %) in the headspace as a function of storage time

| Sample | Initial (~4 hrs.) | 24 hrs. |
| --- | --- | --- |
| CL-145 (conditioned) | 92.31 | 43.37 |
| CL-145 (non-conditioned) | 95.52 | 93.41 |
| Control | 96.64 | 96.72 |

The initial readings were taken within four hours after the jars were sealed. The jars containing the moisture conditioned film samples showed a moderate amount of $CO_2$ reduction in the headspace within one day. However, the non-conditioned samples did not scavenge any headspace $CO_2$ in the first day.

EXAMPLE 6

Another film sample was prepared using the typical extrusion conditions listed in Example 2, except that two gravimetric feeders were used. The feed rate was 10 lbs/hour for both feeders. In this sample, NaCl was used as the moisture retaining agent. A fine powder grade of NaCl was obtained from Morton International. The product code is Extra Fine 325. The sample designation and composition is:

CL-147:45% $Ca(OH)_2$/5% NaCl/45% LDPE/5% VE concentrate

The film sample was stored in a sealed polyethylene bag before use. Again, approximately 5 g of film was placed in each jar (500 ml with rubber septa/aluminum seal). The conditioned jars were prepared by placing the jars, with film sample inside and uncapped, in a controlled environmental chamber operating at 55° C. and 88% RH. The samples were conditioned for 6 hours. Then the jars (both the conditioned and the non-conditioned) were purged with $CO_2$ for 90 seconds and then sealed with a crimper for the test. Data is an average of three jars. Control jars (without any film samples) were also $CO_2$ flushed and sealed. Data was only collected for the first 24 hour period.

TABLE 6

$CO_2$ content (vol %) in the headspace as a function of storage time

| Sample | Initial (~4 hrs.) | 24 hrs. |
| --- | --- | --- |
| CL-147 (conditioned) | 86.14 | 27.92 |
| CL-147 (non-conditioned) | 96.09 | 93.32 |
| Control | 96.64 | 96.72 |

The initial readings were taken within four hours after the jars were sealed. The jars containing the moisture conditioned samples showed a large amount of $CO_2$ reduction in the headspace within one day. However, the non-conditioned samples did not scavenge much $CO_2$ within one day.

EXAMPLE 7

Another film sample was prepared using the typical extrusion conditions listed in Example 2, except that two gravimetric feeders were used. The feed rate was 10 lbs/hour for both feeders. In this sample, KOH was added as the moisture producing/retaining agent. The KOH was obtained from NAKOH Chemical Company, Inc. The sample designation and composition is:

CL-196:45% $Ca(OH)_2$/5% KOH/45% LDPE/5% VE concentrate

The film sample was stored in a sealed polyethylene bag before use. Again, approximately 5 g of film was placed in each jar (500 ml with rubber septa/aluminum seal). No sample conditioning was employed in this experiment. Both the sample jars and the controls (contained no sample) were flushed with $CO_2$ for 90 seconds and then sealed. Data is an average of three jars. Only 24 hours of data has been collected.

TABLE 7

$CO_2$ content (vol %) in the headspace as a function of storage time

| Sample | Initial (<1.5 hrs.) | 24 hrs. |
|---|---|---|
| CL-196 (non-conditioned) | 95.2 | 6.77 |
| Control | 96.61 | 96.56 |

The initial readings were taken immediately after the jars were sealed. The film samples scavenged a large amount of $CO_2$ in the headspace within the first day.

Although various preferred embodiments of the present invention have been described herein in detail, it will be appreciated by those skilled in the art, that variations may be made thereto without departing from the spirit of the invention or the scope of the appended claims.

What is claimed is:

1. A carbon dioxide scavenging layer for packages or containers comprising:
   at least one composite carbon dioxide scavenging filler dispersed into a polymeric matrix, wherein the composite carbon dioxide scavenging filler comprises
   i) a carbon dioxide scavenging filler, and
   ii) a moisture producing and retaining agent or moisture retaining agent.

2. The carbon dioxide scavenging layer for packages, or containers, as claimed in claim 1, further comprising at least one dispersion compatabilizing agent aiding in uniform dispersion and wetting of the at least one composite carbon dioxide scavenging filler into the polymeric matrix.

3. The carbon dioxide scavenging layer for packages, or containers, as claimed in claim 1, further comprising an antioxidant or thermal stabilizer, wherein said antioxidant or thermal stabilizer is present in a range from about 0.01% to 4% by weight of the layer.

4. The carbon dioxide scavenging layer for packages, or containers, as claimed in claim 1, wherein the polymeric matrix is a polyethylene, a polypropylene, an ethylene vinyl alcohol copolymer, an ethylene vinyl acetate copolymer, a zinc ionomer or a sodium ionomer.

5. The carbon dioxide scavenging layer for packages, or containers, as claimed in claim 1, wherein the at least one carbon dioxide scavenging filler is calcium oxide, calcium hydroxide, magnesium oxide, magnesium hydroxide, sodium oxide, sodium hydroxide, potassium hydroxide or mixtures thereof.

6. The carbon dioxide scavenging layer for packages, or containers, as claimed in claim 1, wherein the moisture producing and retaining agent is an alkali metal hydroxide or an alkali metal oxide, or mixtures thereof.

7. The carbon dioxide scavenging layer for packages, or containers, as claimed in claim 6, wherein the alkali metal hydroxide is sodium hydroxide or potassium hydroxide.

8. The carbon dioxide scavenging layer for packages, or containers, as claimed in claim 6, wherein the alkali metal oxide is sodium oxide.

9. The carbon dioxide scavenging layer for packages, or containers, as claimed in claim 1, wherein the moisture retaining agent is a hygroscopic desiccant material.

10. The carbon dioxide scavenging layer for packages, or containers, as claimed in claim 9, wherein the hygroscopic desiccant material is silica gel, bentonite clay, sodium chloride, potassium chloride, lithium chloride, calcium chloride, magnesium chloride, attapulgite clay, magnesium sulfate, or mixtures thereof.

11. The carbon dioxide scavenging layer for packages, or containers, as claimed in claim 1, wherein the particulate size of the at least one carbon dioxide scavenging filler ranges from approximately 0.0005 mm to 0.09 mm.

12. The carbon dioxide scavenging layer for packages, or containers, as claimed in claim 1, wherein the particulate size of the at least one carbon dioxide scavenging filler ranges from approximately 0.005 mm to 0.06 mm.

13. The carbon dioxide scavenging layer for packages, or containers, as claimed in claim 1, wherein the at least one composite carbon dioxide scavenging filler is present in a final concentration of the carbon dioxide scavenging layer in a range from about 10 to 90% by weight of the layer.

14. The carbon dioxide scavenging layer for packages, or containers, as claimed in claim 1, wherein the at least one composite carbon dioxide scavenging filler is present in a final concentration of the carbon dioxide scavenging layer in a range from about 30 to 70% by weight of the layer.

15. The carbon dioxide scavenging layer for packages, or containers, as claimed in claim 2, wherein the at least one dispersion compatabilizing agent is a low molecular weight polymer, or a surfactant with a compatabilizing functionality such as an acid, an acid salt, an anhydride or an ester.

16. The carbon dioxide scavenging layer for packages, or containers, as claimed in claim 2, wherein the at least one dispersion compatabilizing agent is present in a final concentration of the carbon dioxide scavenging layer in a range from about 0.5 to 20% by weight of the layer.

17. The carbon dioxide scavenging layer for packages, or containers, as claimed in claim 2, wherein the at least one dispersion compatabilizing agent is present in a final concentration of the carbon dioxide scavenging layer in a range from about 1 to 10% by weight of the layer.

18. The carbon dioxide scavenging layer for packages, or containers, as claimed in claim 1, wherein the at least one composite carbon dioxide scavenging filler is incorporated into the polymer matrix using a melt process by compounding the at least one composite carbon dioxide scavenging filler into the polymer matrix using melt compounding equipment selected from the group consisting of a twin screw extruder, a single screw kneader and a Banbury mixer.

19. The carbon dioxide scavenging layer for packages, or containers, as claimed in claim 1, wherein the carbon dioxide scavenging layer is extrusion coated, coextrusion coated, or film laminated onto a product contact side of a single layer, or composite layer of the packages, or containers.

20. The carbon dioxide scavenging layer for packages, or containers, as claimed in claim 1, wherein the carbon dioxide scavenging layer has a surface with an increased surface area which contacts a product contained in the packages, or the containers.

21. The carbon dioxide scavenging layer for packages, or containers, as claimed in claim 20, wherein the increased surface area is obtained by corrugation of the carbon dioxide scavenging layer, or by adding ribs or gussets of the carbon dioxide scavenging layer.

22. The carbon dioxide scavenging layer for packages, or containers, as claimed in claim 1, wherein the carbon dioxide scavenging layer is extrusion coated, or coextrusion coated, onto a layer, or a substrate, with a tie layer selected from the group consisting of ethylene acrylic acid copolymer, ethylene methacrylic acid copolymer, zinc ionomer, ethylene methyl acrylate copolymer, ethylene maleic anhydride copolymer, low density polyethylene and linear low density polyethylene.

23. The carbon dioxide scavenging layer for packages, or containers, as claimed in claim 1, wherein the carbon dioxide layer is extrusion coated, or coextrusion coated onto a layer, or a substrate, with a product contact layer selected from the group consisting of ethylene acrylic acid copolymer, ethylene methacrylic acid copolymer, zinc ionomer, ethylene methyl acrylate copolymer, ethylene maleic anhydride copolymer, low density polyethylene and linear low density polyethylene.

24. The carbon dioxide scavenging layer for packages, or containers, as claimed in claim 3, wherein the antioxidant or thermal stabilizer is a hindered phenol, hindered amine, phosphite, lactone, vitamin E compound, metal deactivator, secondary amine or blends thereof.

* * * * *